(12) United States Patent
Prophet et al.

(10) Patent No.: US 12,387,461 B2
(45) Date of Patent: Aug. 12, 2025

(54) SYSTEM AND METHOD FOR ANNOTATING CAR RADAR DATA

(71) Applicant: Rohde & Schwarz GmbH & Co. KG, Munich (DE)

(72) Inventors: Robert Prophet, Erlangen (DE); Marcel Hoffmann, Erlangen (DE); Michael Stelzig, Erlangen (DE); Martin Vossiek, Fuerth (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 344 days.

(21) Appl. No.: 18/031,621

(22) PCT Filed: Oct. 14, 2021

(86) PCT No.: PCT/EP2021/078438
§ 371 (c)(1),
(2) Date: Apr. 13, 2023

(87) PCT Pub. No.: WO2022/079162
PCT Pub. Date: Apr. 21, 2022

(65) Prior Publication Data
US 2023/0386175 A1 Nov. 30, 2023

(30) Foreign Application Priority Data
Oct. 16, 2020 (DE) ...................... 10 2020 127 315.0

(51) Int. Cl.
*G06K 9/00* (2022.01)
*G01S 13/89* (2006.01)
(Continued)

(52) U.S. Cl.
CPC ............ *G06V 10/764* (2022.01); *G01S 13/89* (2013.01); *G06T 7/11* (2017.01); *G06V 10/26* (2022.01); *G06V 20/56* (2022.01)

(58) Field of Classification Search
CPC .......... G06N 3/045; G06N 3/08; G06N 20/00; G06N 7/01; G06N 5/046; G06N 7/023;
(Continued)

(56) References Cited

U.S. PATENT DOCUMENTS

2020/0072943 A1 3/2020 Laur et al.
2020/0218979 A1* 7/2020 Kwon ...................... G06N 3/08
(Continued)

OTHER PUBLICATIONS

International Search Report and Written Opinion (with English translation of International Search Report) issued in corresponding International Patent Application No. PCT/EP2021/078438 dated Jan. 26, 2022 (17 pages).
(Continued)

*Primary Examiner* — Alex Kok S Liew
(74) *Attorney, Agent, or Firm* — Kieran O'Leary; 2SPL Patent Attorneys PartG mbB (57) ABSTRACT

The invention relates to a system for annotating car radar data, comprising: at least one radar arranged on a car for producing a radar image by means of radar measurement; at least one optical detection system arranged outside the car for producing a camera image; a segmentation unit, which is designed to subject a camera image produced by the optical detection system to semantic segmentation for forming a semantic grid in order to assign one of a plurality of object classes to the camera image pixel by pixel; a computing unit, which is designed to transfer the camera image and/or the radar image into a common coordinate system for co-registration; and an annotation unit, which is designed to carry out annotation of the radar image, in other words to allocate an object class to a radar target of the radar image, in such a way that the object class of the semantic grid of the co-registered camera image in which the radar target of the co-registered radar image is located is allocated to a particular radar target.

20 Claims, 3 Drawing Sheets (51) Int. Cl.
    *G06T 7/11*           (2017.01)
    *G06V 10/26*        (2022.01)
    *G06V 10/764*      (2022.01)
    *G06V 20/56*        (2022.01)

(58) Field of Classification Search
    CPC ............ G06N 7/02; G06N 5/02; G06N 5/047; G06N 3/084; G06N 3/042; G06N 3/044; G06N 3/0464; G06N 3/043; G06N 20/10; G06N 3/04; G06N 3/006; G06N 3/02; G06N 3/047; G06N 3/09; G06N 5/01; G06V 20/58; G06V 10/82; G06V 20/56; G06V 10/764; G06V 10/454; G06V 10/25; G06V 10/774; G06V 10/803; G06V 10/763; G06V 20/584; G06V 20/70; G06V 10/70
    See application file for complete search history.

(56) References Cited

U.S. PATENT DOCUMENTS

2020/0357143 A1* 11/2020 Chiu ...................... G06F 18/253
2021/0043002 A1* 2/2021 Zeng ......................... G06T 7/74
2021/0156963 A1* 5/2021 Popov .................... G06N 3/045
2021/0255304 A1* 8/2021 Fontijne ................. G06V 20/10

OTHER PUBLICATIONS

Office Action issued in corresponding German Patent Application No. 10 2020 127 315.0 dated Jun. 25, 2021 (7 pages).

Nigam et al., "Ensemble Knowledge Transfer for Semantic Segmentation," 2018 IEEE Winter Conference on Applications of Computer Vision (WACV), Mar. 12-15, 2018, pp. 1499-1508.

Quaknine et al., "CARRADA Dataset: Camera and Automotive Radar with Range-Angle-Doppler Annotations," 2020 25th International Conference on Pattern Recognition (ICPR), May 4, 2020, pp. 5068-5075.

Persson et al., "Fusion of aerial images and sensor data from a ground vehicle for improved semantic mapping," Robotics and Autonomous Systems vol. 5, No. 6, Jun. 30, 2008, pp. 483-492.

Wang et al., "RODNet: Object Detection under Severe Conditions Using Vision-Radio Cross-Modal Supervision," arxiv.org, Cornell University Library, Mar. 3, 2020, XP081613881 (10 pages).

* cited by examiner

SYSTEM AND METHOD FOR ANNOTATING CAR RADAR DATA

This application is a National Stage Application of PCT/EP2021/078438, filed Oct. 14, 2021, which in turn claims priority to German Patent Application No. 10 2020 127 315.0 filed Oct. 16, 2020.

Autonomous land vehicles will have a positive influence on road traffic in a variety of ways. Automobile radars are increasingly being used to achieve an automation level of 3, that is high automation driving, or higher.

It is advantageous for the evaluation and interpretation of the radar data to use so-called artificial intelligence (abbreviation: AI) so that machine learning algorithms represent an important research focus. In this respect, training datasets are required for methods of supervised machine learning that are as large as possible and that hold the respectively desired starting information in the form of annotations. An example for such an annotation is the association of an object class with the targets detected in the radar data, for instance "human" or "bicycle". Ultimately, such training datasets are one of the most important and most challenging aspects of AI and the acquisition of such datasets is associated with huge costs. The existence and possession of such datasets is consequently extremely valuable and represents a significant competitive advantage in the development of highly automated vehicles. The quality of the training datasets is thus at times also definitively responsible for what performance can be achieved with an artificial intelligence to be trained.

Automobile radars typically deliver three-, four- or even higher dimensional radar signal datasets from which subsequently a radar point cloud is extracted that comprises all the radar targets of a measurement. There are many different types of radar with which the targets can be determined, with it being clear to the skilled person, however, that the present invention is not restricted to a specific radar type. A radar target is understood as a local maximum in the radar signal dataset that exceeds a certain threshold value with respect to the reflected signal power. The addressed extraction takes place inter alia for reasons of storage reduction and is always associated with a certain loss of information. The mentioned machine learning algorithms can already achieve good results on the basis of radar point clouds, with it being clear to the skilled person, however, that access to the total radar signal dataset would permit even better performance results, cf. A. Palffy, J. Dong, J. F. P. Kooij, and D. M. Gavrila, "*CNN Based Road User Detection Using the 3D Radar Cube*," in IEEE Robotics and Automation Letters, vol. 5, Issue 2, 2020, pp. 1263-1270.

There are only three public automobile radar datasets at the present time:

Astyx HiRes2019 (cf. H. Caesar et al., "*nuScenes: A multimodal dataset for autonomous driving*," arXiv preprint: 1903.11027, 2019), nuScenes (cf. M. Meyer and G. Kuschk, "*Automotive Radar Dataset for Deep Learning Based* 3D Object Detection," in Proc. of 16th European Radar Conference (EuRAD), Paris, France, 2019), and Oxford Radar RobotCar (cf. D. Barnes, M. Gadd, P. Murcutt, P. Newman, and I. Posner, "*The Oxford Radar RobotCar dataset: A radar extension to the Oxford RobotCar dataset*," in Proc. of International Conference on Robotics and Automation (ICRA), Paris, France, 2020).

Each of these datasets only provides radar point clouds and has different weaknesses. For instance. Astyx HiRes2019 comprises fewer than 600 measurements without any annotation of the radar targets. nuScenes admittedly has annotated radar targets, but the radars used do not correspond to the state or the art or they only deliver very few radar targets per measurement cycle Finally, Oxford Radar RobotCar has reference measurement technology, but no annotations. The dataset is moreover based on a radar that is mounted on the vehicle roof and that thus does not correspond to current market demands.

As a result, there is a need for a further public dataset having complete annotation. Since the most time consuming and most error prone partial step in the generation of such a dataset is the annotation, a degree of automation that is as high as possible is particularly profitable for this purpose.

The majority of annotations are implemented by a comparison of the radar point cloud with camera images that are located in the passenger compartment of the ego vehicle. In this context, the ego vehicle is that vehicle that is equipped with radars whose data are to be annotated. Since the cameras, exactly like the radars, are at vehicle height, they observe the environment of the vehicle with a direction of view approximately in parallel with the ground or at an angle included with the ground that is less than 10°.

The comparison of the radar data with the camera data is, however, frequently very difficult since cameras deliver comparatively poor distance information down to no distance information at all. Cameras furthermore only detect the objects with a direct line of sight, whereas radars are able to detect objects located behind one another—for example vehicles driven behind one another or a person behind a vehicle—in some measurement situations, whereby a full annotation cannot be ensured. This is particularly disadvantageous since the specific strengths of radar systems in current training datasets are thus only mapped with great difficulty or not at all and the full information content of the radar data cannot be used in conventional AI approaches.

It is furthermore known from the prior art to annotate by a comparison of the radar point cloud with a high resolution lidar point cloud. Apart from the very high costs of such a lidar, the same problems results here as with the passenger compartment cameras according to which objects located behind one another are not detected.

A process was presented in the paper: N. Scheiner, N. Appenrodt, J. Dickmann, and B. Sick, "*Automated Ground Truth Estimation of Vulnerable Road Users in Automotive Radar Data Using GNSS*," in Proc. of International Conference on Microwaves of Intelligent Mobility, Detroit (MI), USA, 2019, in which pedestrians and cyclists were equipped with mobile satellite navigation systems, whereby corresponding regions of the radar point cloud could be automatically annotated. In addition to the huge costs of the process, in particular the non-annotation of infrastructure objects and of traffic participants that are not equipped with such a system has proven disadvantageous in this respect.

It is accordingly the aim of the present invention to provide an improved and nevertheless highly automatable annotation of automobile radar data to overcome the disadvantages listed above.

This is done using a system that has all the features of claim 1 or using a method that has all the method steps of claim 10.

The system in accordance with the invention for the annotation of automobile radar data accordingly comprises at least one radar arranged at an automobile for generating at least one radar image by at least one radar measurement; at least one optical detection system, arranged outside the automobile, for generating a camera image; an interpretation unit that is adapted to evaluate a camera image detected by the optical detection system (4) to define at least two zones of different object classes on the camera image, with the interpretation unit preferably being a segmentation unit that is adapted to subject a camera image generated by the optical detection system to a semantic segmentation for the formation of a semantic grid to associate one of a plurality of object classes pixel-wise to the camera image; a processor unit that is adapted to transmit the camera image and/or the radar image into a common coordinate system for co-registration; and an annotation unit that is adapted to carry out an annotation of the radar image, that is the assignment of an object class to a radar target of the radar image, such that that object class of the co-registered camera image that is divided into different object classes and in which the radar target of the co-registered radar image is disposed is assigned to a respective radar target.

This optical detection system can be: a camera or a stereo camera, or a time of flight camera (optionally together with a camera), or a laser scanner (optionally together with a camera). Each implementation of the optical detection unit is configured to generate a camera image that contains the recorded information.

Provision can furthermore be made that the annotation unit is adapted to carry out an annotation of the radar image, that is the assignment of an object class to a radar target of the radar image, such that that object class of the semantic grid of the co-registered camera image is assigned to a respective radar target in which the radar target of the co-registered radar image is disposed.

The key to the invention is now the automatic association of the radar target with the respective object class of the semantic grid in which the radar target is disposed, with the semantic grid being based on a camera image that has been recorded from outside the automobile.

On a corresponding arrangement of the optical detection system, objects that cannot be seen from the automobile can be classified and also annotated without error so that the full potential of a radar system can be trained. A second vehicle that cannot be seen from the automobile and that is optically screened by a first vehicle can thus, for example, now be easily recognized in the camera image. This second vehicle is now correspondingly segmented so that radar targets can now also be annotated that would have remained hidden with an optical detection unit in the automobile after a transformation of the camera image into a common coordinate system with the radar image.

The recorded camera image is accordingly first evaluated by the interpretation unit to divide the image into zones of at least two different object classes. The recorded camera image can preferably be converted into a semantically segmented map (a semantic grid in the following). An object class is associated pixel-wise with the camera image in this semantic grid so that an optical annotation is carried out. This partial step should preferably be carried out by an artificial neural network since this is particularly time saving. It appears sensible here to work in accordance with the model of the following disclosure: I. Nigam, C. Huang, and D. Ramanan, "*Ensemble Knowledge Transfer for Semantic Segmentation*" in Proc. of Winter Conference on Applications of Computer Vision, Lake Tahoe (NV), USA, 2018.

A transfer of the radar image or of the radar point cloud derived therefrom into the semantic grid takes place with the aid of a coordinate transformation of one of the two images or also of both images so that both coordinate systems are co-registered.

To optimize the co-registration, optical markers can be attached to the ego vehicle in advance whose positions in the vehicle coordinate system are known. Exact coordinates in the vehicle coordinate system can thereby be continuously associated with the pixels occupied by the markers in the camera image (or also vice versa) from which a transformation rule for further pixels can be deduced. This is in particular advantageous when no structural connection is present between the automobile (that is the ego vehicle) and the optical detection system, but the two are rather formed independently of one another.

If the camera image and the radar image are present in a common coordinate system, an annotation of the radar targets contained in the radar image can now take place in a simple manner. That object class that the semantic grid specifies at the point of the respective radar target is now assigned to a radar target in the co-registered image in which the camera image and the radar image are present in a common coordinate system. The semantic grid can thereby be seen as a kind of template in the annotation so that the radar targets distributed over the co-registered image are associated with those object classes that the semantic grid has at the point of a respective radar target. The process is reduced to a simple reading that can be carried out very quickly and with little processing power. Radar-specific measurement uncertainties can be taken into account in the zone of the radar target. It is furthermore possible to annotate the entire portion of the radar signal dataset that is dependent on the distance azimuth elevation on the basis of a geometrical association with the semantic grid. It is clear to the skilled person here that on an insufficient geometrical resolution, a further spatial separation can be carried out via the speed dependent portion of the radar signal dataset.

Provision can be made in accordance with an optional further development of the invention that the direction of view of the optical detection system for generating the camera image does not extend in parallel with the direction of view of the radar image, with the direction of view of the optical detection system preferably including an angle of at least 45°, preferably of at least 67.5° and particularly preferably of at least 75°, with a support surface of the automobile and/or the direction of view of the radar, and/or with the direction of view of the optical detection system extending perpendicular or approximately perpendicular to a support surface of the automobile and/or the direction of view of the radar.

It can be ensured by the different orientations of the optical detection system and the radar that the camera image is recorded from a different perspective than the radar image. If, for example, the optical detection system is arranged at a very much higher position than the radars (for example 3 m above the radar), the optical detection system can recognize things that would have been optically hidden on a positioning at an identical or similar position to the radar. It is now possible by the change of the perspective that the optical detection system generates camera images that carry a great deal more information on the radar detection zone in them than if they had been taken at a similar position to the radar. A bird's eye view that at least partly covers the radar detection zone in particular offers a great deal more depth information for the radar image since there are no optical obstacles that impair the far view or they are only present to a considerably reduced degree, viewed from the radar.

Provision can furthermore be made in accordance with the present invention that the radar and the optical detection system are aligned such that their detection zones at least partially overlap. It is particularly advantageous if the optical detection system detects the zone of the radar antenna or of the radar array itself so that, starting from the radar, all the objects in the detection zone of the optical detection system can be annotated.

Provision can be made in accordance with an optional further development of the invention that the optical detection system is adapted to generate stereoscopic camera images or 3D camera images, with at least two mutually spaced apart recording units, preferably at least four mutually spaced apart recording units, preferably being provided for this purpose.

The generation of stereoscopic camera images can be implemented, for example, by a ToF camera or by a laser scanner. It can be advantageous on a use of a ToF camera and/or of a laser scanner to use a regular camera in addition thereto.

The advantage of stereoscopic recordings is the possibility of processing height information in the camera image so that the information not relevant to an automobile can be filtered at a corresponding point. The decisive zone relevant to an automobile can thus be restricted to a height of less than 5 m or less than 3 m from the ground so that annotations only take place in the relevant zone and the likelihood of a defective segmentation or annotation is reduced.

Provision can furthermore be made in accordance with the present invention that the optical detection system is arranged at the automobile via a mechanical construction above a roof of the automobile, with the vertical distance of the optical detection unit from the roof preferably being at least one meter, more preferably at least 2 meters.

Provision can also be made here that the optical detection system is fastened to a telescopic apparatus that can be extended upwardly away from the room of the automobile.

The optical detection device can be arranged in a Steadicam so that the camera images obtained are not blurred and also record an image detail that is as constant as possible even on vibrations.

It is clear to the skilled person that the optical detection unit does not have to be structurally connected to the ego vehicle, that is to the automobile. It could, for example, also be arranged independently thereof at a stationary post or the like.

Provision can furthermore also be made in accordance with a further development of the present invention that the optical detection system is guided floating freely by means of at least one aerial drone and preferably has a vertical distance of at least one meter, preferably at least 2 meters, and further preferably at least 5 meters, from a roof or a support surface of the automobile during the generation of the camera image. Heights in the range of 30 to 50 m are, however, also possible. This vertical range represents a normal altitude for a drone.

Provision can additionally be made that the distance of the drone from the ground depends on the field of view of the radars. A different height of the drones can thus be used for long range drones that have a view of several hundred meters (for example: 150 m) in some cases than for short range radars whose field of view typically does not exceed 100 m (for example: 30 m). A lower altitude will be set for short range radars than for long range radars.

Provision can be made here that the optical detection system has a plurality of recording units that are each guided by an associated aerial drone, with the detection zone of each of the recording units carried by the aerial drones preferably at least partially overlapping. The plurality of aerial drones are advantageously at least 4 m apart from one another so that the basis of the different cameras is very large on the recording of stereoscopic images.

Provision can furthermore be made in accordance with a further development of the invention that the optical detection system guided by means of at least one aerial drone has a regulation device so that it maintains a predefined position and orientation with respect to the automobile, also during travel of the automobile.

This simplifies the transformation of the images recorded by the optical detection system since it remains the same with a known relative position to the automobile or to the radar. If the position and orientation of the optical detection system with respect to the automobile were to change, in contrast, the transformation of the obtained images would always have to be adapted thereto in a common coordinate system, with the constant exact tracking of the two positions and orientations of the automobile and the drone being necessary for this. It must additionally also be noted here that there is an ideal position of the drone from where the optical detection zone carried by it has an optimum detection zone. If the position of the drone changes, the detection zone is consequently no longer optimum.

Provision can preferably be made that each of the at least one aerial drones is designed such that suitable measurement means and preferably a control/regulation device is present that provides that it also adopts a predefined or at least known pose (pose=position and orientation) relative to the ego vehicle (automobile) during the travel of the ego vehicle. This pose will also be called the working point WP in the following. The WP is preferably to be selected such that the camera systems view a zone that is as large as possible that is covered by the fields of view of the radars of the ego vehicle.

The holding of the working point relative to the ego vehicle can preferably be implemented by a suitable regulation. Exact positions of the ego vehicle and of the UAVs are required for this. The following variants are conceivable as preferred embodiment variants for the measurement means for the position determination:

Global navigation satellite system (GNSS), e.g. DGPS, and inertial sensor system in the ego vehicle and the aerial drone(s), as well as radio communication between the ego vehicle and the aerial drone(s)

GNSS and inertial sensor systems in aerial drone(s); the position of the ego vehicle is deduced from the camera images, with optical markers being attached to the ego vehicle The aerial drone(s) and the ego vehicle are provided with transponders and the location with respect to one another is detected by a radio location system In the event of an obstacle (e.g. a bridge or a tree that projects over the roadway) in the planned aerial drone trajectory, the at least one aerial drone has to have a corresponding obstacle recognition. With a known obstacle, it would be particularly expedient for the trajectory to be adapted optimally and in real time so that the WP can be returned to as fast as possible again and any loss of information is simultaneously minimized.

Provision can be made in accordance with a further optional modification of the invention that the system further comprises a filter unit that is adapted to subject the camera image to a filtering process prior to the processing by the segmentation unit to bound the relevant zones of the camera image to a zone close to the ground that extends up to approximately meters from the ground, preferably 4 meters from the ground, and more preferably 3 meters from the ground.

It appears sensible here for the camera image to be a stereoscopic image that has height information.

It is clear to the skilled person that the units explained above such as the segmentation unit, the processor unit, the annotation unit, and/or a filter unit do not necessarily have to be units that differ from one another, but can also be implemented by a single unit or a plurality of units, for example a processor.

The invention further relates to a method of annotating automobile radar data, preferably using a system in accordance with one of the claims described above, wherein in the method: a radar image is generated by a radar measurement by at least one radar arranged at an automobile; a camera image is generated by at least one optical detection system that is arranged outside the automobile; the camera image is subjected to an evaluation for the formation of at least two zones of different object classes on the camera image, with the camera image preferably being subjected to a semantic segmentation for the formation of a semantic grid to associate one of a plurality of object classes pixel-wise with the camera image; the camera image and/or the radar image is/are transferred into a common coordinate system for co-registration; and an annotation of the radar image, that is the assignment of an object class to a radar target of the radar image, is carried out such that object class of the co-registered radar image that is divided into different object classes and in which the radar target of the co-registered image is disposed is assigned to a respective radar target.

Provision can preferably be made that that object class of the semantic grid of the co-registered camera image in which the radar target of the co-registered radar image is disposed is assigned to a respective radar target.

Provision can preferably be made here that the direction of view of the camera image is not in parallel with the direction of view of the radar image, with the direction of view of the camera image preferably including an angle of at least 45°, more preferably of at least 67.5°, and particularly preferably of at least 75°, with a support surface of the automobile and/or the direction of view of the radar, and/or with the direction of view of the camera image extending perpendicular or approximately perpendicular to a support surface of the automobile and/or the direction of view of the radar.

In accordance with an optional variation of the method, the camera image can at least partially overlap a cover zone of the radar image in which at least one radar target is present, with it being of advantage if the overlap zone is as large as possible. It is accordingly to be preferred for the detection zone of the optical detection system to completely cover the detection zone of the radar.

Provision can additionally be made that the radar image originates from multidimensional radar signal datasets from which an extracted radar point cloud is preferably acquired that comprises all the detected radar targets of the radar measurement.

In accordance with a further development of the method, the formation of at least two zones of different object classes of the camera image is carried out in that a semantic segmentation of the camera image assigns an object class to each pixel that is preferably carried out by means of a neural network, with the plurality of object classes enabling a division into at least two object classes of the following, non-exclusive list: Unknown, background, building, obstacle, road vegetation, human, automobile, and/or bicycle.

Provision can also be made that the camera image is subjected to a filtering process prior to the forming of at least two zones of different object classes of the camera image, preferably of the segmentation grid, to bound the relevant zones of the camera image to a zone close to the ground that extends up to approximately 5 meters from the ground, preferably 4 meters from the ground, and more preferably 3 meters from the ground.

Further features, details and advantages of the invention will become visible with reference to the following description of the Figures. There are shown.

Figure 1:
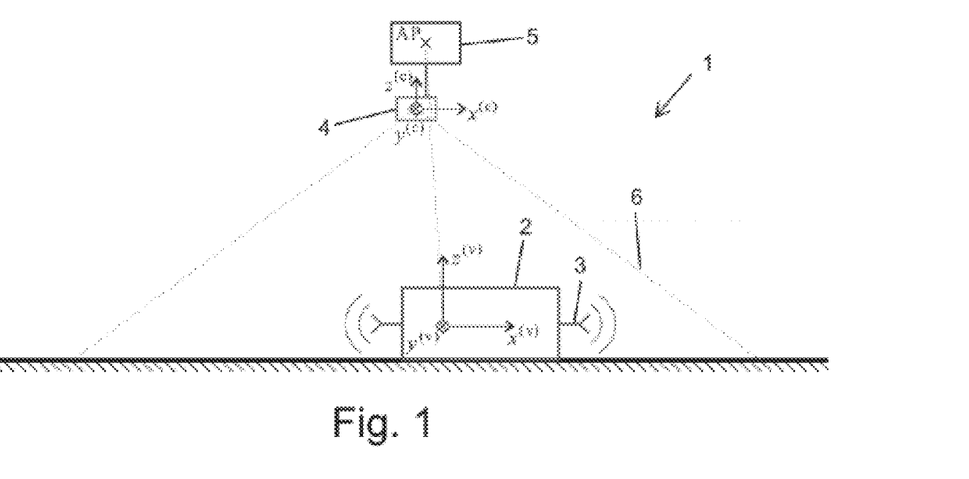
FIG. 1 a side view of an aerial drone carrying the optical detection system with an automobile containing the radar arranged therebelow.

FIG. 1 shows a side view of an aerial drone 5 carrying the optical detection system 4 with an automobile 2 (also: ego vehicle) containing the radar 5 arranged therebelow. It can be recognized that the optical detection system 4 has a different perspective than the radar 3 arranged close to the ground. Advantages can be produced in the annotation of radar targets from this circumstance since objects, actually hidden viewed from the radar 3, can be recognized due to the different perspective of the optical detection system 4 and can be correctly associated in the annotation. A neural network to be trained can then be supplied with better training data in the supervised learning so that a neural network trained on the basis of these data becomes more high performance.

Each of the at least one aerial drones 5 can here be designed such that it comprises suitable measurement means and preferably a control/regulation device is present that provides that it adopts a predefined or at least known pose (pose=position and orientation) relative to the ego vehicle 2, also during the travel of the ego vehicle. This pose will also be called a working point WP. The working point WP is preferably to be selected such that the optical detection systems 4 or camera systems view a zone 6 that is as large as possible that is covered by the fields of view of the radars 3 of the ego vehicle.

It can further be recognized that both the vehicle 2 and the optical detection system use independent coordinate systems. If, however, the relative spatial dependence (position and orientation) of the aerial drone 5 or of the camera 4 fastened thereto and of the ego vehicle 2 is known, the generated images can be transformed into a common coordinate system.

The drone 5 holds its position relative to the ego vehicle 2 constant. Due to the three-dimensionality of the problem, six degrees of freedom results for this, translation into x, y, z, and angles of yaw, pitch, and roll. A transformation of the camera coordinate system into the vehicle coordinate system or vice versa is possible with knowledge of the two poses with respect to one another.

Figure 2:
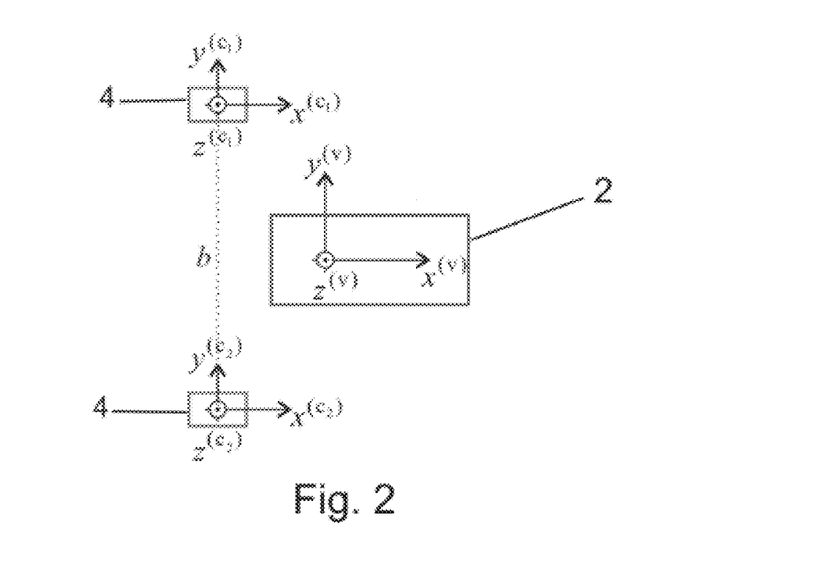
FIG. 2 a plan view of the system in accordance with the invention in which the optical detection system is implemented by two aerial drones.

FIG. 2 shows a plan view of the system in accordance with the invention in which the optical detection system 4 is implemented by two recording units 4. The two recording units 4 can each be carried by a drone 5, with it also being conceivable, however, that the two recording units 4 are connected to the vehicle 2 via a mechanical construction.

Since automobile radars measure almost exclusively win the zone close to the ground, i.e. up to approximately 3 m above the support surface, it is of advantage for the semantic grid to relate to the ground. It appears sensible for this purpose to generate a height profile that is preferably deduced from the camera system. A stereoscopic recording can be produced by using a stereo camera that consists of two cameras 4 of two drones 5 so that then elements in a non-relevant height zone can be filtered. The distance b between the at least two drones 5 here describes the basis between the two cameras 4 required for the stereoscopic recording. It can be selected as very large in the present case so that the stereoscopic recording is of good quality.

Figure 3:
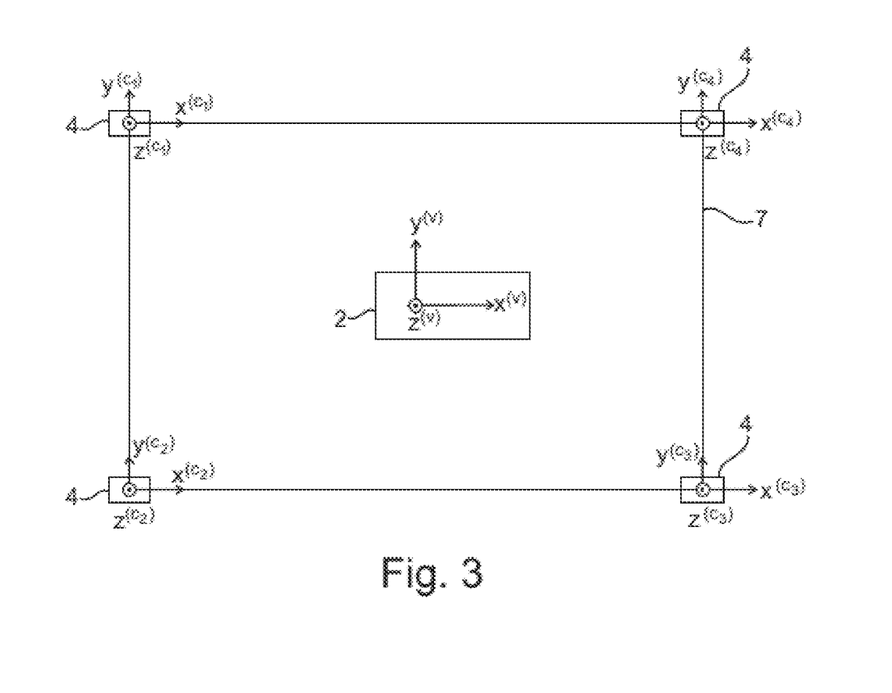
FIG. 3 a plan view of the system in accordance with the invention of a further embodiment in which the optical detection system is implemented by four aerial drones.

FIG. 3 shows a plan view of the system 1 in accordance with the invention in a further embodiment in which the optical detection system 4 is implemented by four aerial drones Alternatively or additionally to the generation and use of a height profile, there is furthermore the possibility of preparing a respective semantic grid with every camera recording of at least two drones 5 of the optical detection system 4. There is a filtering process on the superposition that relates to objects that are higher than the support surface. The superposed semantic grid thereby delivers a basis that is better for the radar annotation. FIG. 3 illustrate an arrangement of the drones 5 that is advantageous for this purpose and in which the superposed detection zones 7 of the respective camera recording of the drones 5 is highlighted.

Figure 4:
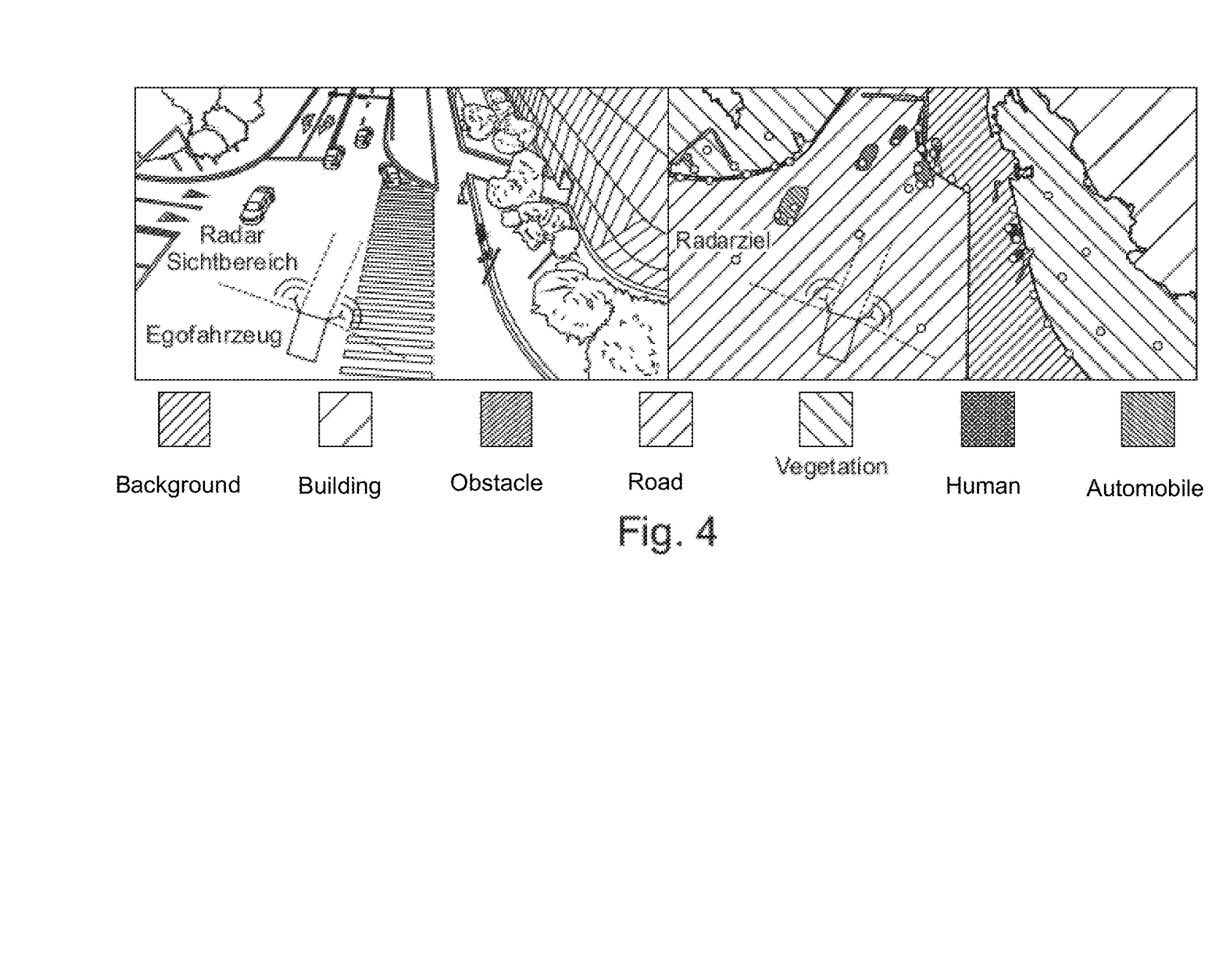
FIG. 4 a comparison of a camera image in the original state with an image semantically segmented thereto into which the radar targets have been inserted by means of coordinate transformation.

FIG. 4 shows a comparison of a camera image in the original state with an image semantically segmented thereto into which the radar targets have been inserted by means of coordinate transformation. This image is based on a photograph that has been taken from the paper: I. Nigam, C. Huang, and D. Ramanan, "Ensemble Knowledge Transfer for Semantic Segmentation" in Proc. of Winter Conference on Applications of Computer Vision, Lake Tahoe (NV), USA, 2018.

The left hand camera image was recorded by a drone 5 and was subsequently transformed into the right hand semantic grid. The annotation of the radar targets transformed into the semantic grid and moreover of the total radar signal dataset is a simple reading with the aid of a coordinate transformation.

In the semantic segmentation, different object classes are associated with the individual pixels or pixel zones of the camera recording. The road is thus recognized as such and is identified as such pixel-wise. The same applies to an automobile or to a human. The different structures are highlighted differently to present the semantic segmentation in an optically simpler manner.

If now, for example, the radar targets are transformed into the coordinate system of the optical detection system 4, that is into the view of the left hand image at which a semantic segmentation has already been carried out, the right hand image is obtained. The points now visible there are radar targets whose intensity has exceeded a certain threshold value.

If the right hand image is now looked at, it can be recognized that the annotation of the radar targets can be carried out very simply in that the object class of the semantic grid is linked to the radar target at the point of a respective radar target.

This annotation can be carried out very simply and can be processed in a highly automated manner by corresponding processors.

The invention claimed is:

1. A system for annotating automobile radar data comprising:
   at least one radar arranged at an automobile for generating at least one radar image by at least one radar measurement;
   an optical detection system arranged outside the automobile for generating at least one camera image;
   an interpretation unit that is adapted to evaluate a camera image sensed by the optical detection system to define at least two zones of different object classes on the camera image, with the interpretation unit being a segmentation unit that is adapted to subject a camera image generated by the optical detection system to a semantic segmentation for the formation of a semantic grid to associate one of a plurality of object classes pixel-wise to the camera image;
   a processor unit that is adapted to transmit the at least one camera image and/or the radar image into a common coordinate system for co-registration; and
   an annotation unit that is adapted to carry out an annotation of the radar image, that is the assignment of an object class to a radar target of the radar image, such that that object class of the co-registered camera image that is divided into different object classes in which the radar target of the co-registered radar image is disposed is assigned to a respective radar target.

2. The system in accordance with claim 1, wherein the direction of view of the optical detection system for generating the camera image does not extend in parallel with the direction of view of the radar image, with the direction of view of the optical detection system preferably including an angle of at least 45°, with a support surface of the automobile and/or the direction of view of the radar, and/or with the direction of view of the optical detection system extending perpendicular or approximately perpendicular to a support surface of the automobile or the direction of view of the radar.

3. The system in accordance with claim 1, wherein the radar and the optical detection system are aligned such that their detection zones at least partially overlap, with the detection zone of the optical detection system completely covering the detection zone of the radar.

4. The system in accordance with claim 1, wherein the optical detection system is adapted to generate stereoscopic camera images, with at least two mutually spaced apart recording units being provided for this purpose.

5. The system in accordance with claim 1, wherein the optical detection system is arranged at the automobile via a mechanical construction above the roof, with the vertical distance of the optical detection unit from the roof being at least one meter.

6. The system in accordance with claim 1, wherein the optical detection system is guided floating freely by means of at least one aerial drone and has a vertical distance of at least one meter, from a roof of the automobile during the generation of the camera image.

7. The system in accordance with claim 1, wherein the optical detection system has a plurality of recording units that are each guided floating freely by an associated aerial drone and/or of which at least one is arranged at the automobile via a mechanical construction above the roof, with the detection zone of each of the recording units carried by the aerial drones and/or of the at least one recording unit held at the mechanical construction at least partially overlapping.

8. The system in accordance with claim 6, wherein the optical detection system guided by means of at least one aerial drone has a regulation device so that it maintains a predefined position and orientation with respect to the automobile, also during travel of the automobile.

9. The system in accordance with claim 1, further comprising a filter unit that is adapted to subject the camera image to a filtering process prior to the processing by the interpretation unit to bound the relevant zones of the camera image to a zone close to the ground that extends up to approximately 5 meters from the ground.

10. A method for annotating automobile radar data, using the system in accordance with claim 1, wherein in said method:
- at least one radar image is generated by at least one radar measurement of at least one radar arranged at an automobile;
- at least one camera image is generated by at least one optical detection system that is arranged outside the automobile;
- the camera image for the formation of at least two zones of different object classes on the camera image is subjected to an evaluation, with the camera image being subjected to a semantic segmentation for the formation of a semantic grid to associate one of a plurality of object classes pixel-wise with the camera image;
- the camera image and/or the radar image is/are transmitted into a common coordinate system for the co-registration; and
- an annotation of the radar image, that is the assignment of an object class to a radar target of the radar image, is carried out such that that object class of the co-registered camera image is assigned to a respective radar target in which the radar target of the co-registered radar image is disposed.

11. The method in accordance with claim 10, wherein the direction of view of the camera image is not in parallel with the direction of view of the radar image, with the direction of view of the camera image including an angle of at least 45°, with a support surface of the automobile and/or with the direction of view of the radar, and/or with the direction of view of the camera image extending perpendicular or approximately perpendicular to a support surface of the automobile and/or the direction of view of the radar.

12. The method in accordance with claim 10, wherein the camera image at least partially overlaps with a cover zone of the radar image in which at least one radar target is present.

13. The method in accordance with claim 10, wherein the radar image originates from a multidimensional radar signal dataset from which an extracted radar point cloud is acquired that comprises all the radar targets of the radar measurement.

14. The method in accordance with claim 10, wherein the formation of at least two zones of different object classes of the camera image is carried out in that a semantic segmentation of the camera image assigns an object class to each pixel that is carried out with the aid of a neural network, with the plurality of object classes enabling a division into at least two object classes of the following, non-exclusive list: Unknown, background, building, obstacle, road vegetation, human, automobile, and/or bicycle.

15. The method in accordance with claim 10, wherein the camera image of at least two zones of different object classes of the camera image is subjected to a filtering process prior to the forming of the segmentation grid, to bound the relevant zones of the camera image to a zone close to the ground that extends up to approximately 5 meters from the ground.

16. The system in accordance with claim 1, wherein the direction of view of the optical detection system for generating the camera image does not extend in parallel with the direction of view of the radar image, with the direction of view of the optical detection system including an angle of at least 75°, with a support surface of the automobile and/or the direction of view of the radar, and/or with the direction of view of the optical detection system extending perpendicular or approximately perpendicular to a support surface of the automobile or the direction of view of the radar.

17. The system in accordance with claim 1, wherein the optical detection system is adapted to generate stereoscopic camera images, with at least four mutually spaced apart recording units, preferably being provided for this purpose.

18. The system in accordance with claim 1, wherein the optical detection system is arranged at the automobile via a mechanical construction above the roof, with the vertical distance of the optical detection unit from the roof being at least 2 meters.

19. The system in accordance with claim 1, wherein the optical detection system is guided floating freely by means of at least one aerial drone and has a vertical distance of at least 5 meters, from a roof of the automobile during the generation of the camera image.

20. The system (1) in accordance with claim 1, further comprising a filter unit that is adapted to subject the camera image to a filtering process prior to the processing by the interpretation unit to bound the relevant zones of the camera image to a zone close to the ground that extends up to approximately 3 meters from the ground.

* * * * *